United States Patent
Sanchez Huipio et al.

(10) Patent No.: US 9,637,085 B2
(45) Date of Patent: May 2, 2017

(54) PET RESTRAINT SYSTEM

(71) Applicant: Ford Global Technologies, LLC, Dearborn, MI (US)

(72) Inventors: Saulo Ratzel Sanchez Huipio, Mexico City (MX); Oscar Rovira Vilchis, Atizapan (MX); Maria Fernanda Pulido Plauchud, Santa Fe/DF (MX)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 14/803,391

(22) Filed: Jul. 20, 2015

(65) Prior Publication Data

US 2017/0021798 A1   Jan. 26, 2017

(51) Int. Cl.
| | |
|---|---|
| *B60R 22/48* | (2006.01) |
| *B60R 22/343* | (2006.01) |
| *B60R 22/10* | (2006.01) |
| *A01K 27/00* | (2006.01) |
| *A01K 11/00* | (2006.01) |
| *A01K 15/04* | (2006.01) |
| *B60R 21/015* | (2006.01) |
| *A01K 15/02* | (2006.01) |

(52) U.S. Cl.
CPC ............ *B60R 22/48* (2013.01); *A01K 11/006* (2013.01); *A01K 15/04* (2013.01); *A01K 27/003* (2013.01); *A01K 27/004* (2013.01); *B60R 22/10* (2013.01); *B60R 22/343* (2013.01); *A01K 15/021* (2013.01); *B60R 21/015* (2013.01); *B60R 21/01512* (2014.10); *B60R 2022/4808* (2013.01)

(58) Field of Classification Search
None
See application file for complete search history.

(56) References Cited

U.S. PATENT DOCUMENTS

| | | | |
|---|---|---|---|
| D235,026 S | 4/1975 | Bogdahn | |
| 4,018,189 A | 4/1977 | Umphries et al. | |
| 5,067,441 A | 11/1991 | Weinstein | |
| 5,241,923 A | 9/1993 | Janning | |
| 5,353,744 A | 10/1994 | Custer | |
| 5,787,841 A | 8/1998 | Titus et al. | |
| 6,265,977 B1 | 7/2001 | Vega et al. | |
| 6,324,453 B1 * | 11/2001 | Breed ................ | B60N 2/0232 180/169 |
| 6,694,922 B2 | 2/2004 | Walter et al. | |
| 2007/0006819 A1 | 1/2007 | Gilbert-Brindley | |
| 2007/0234643 A1 * | 10/2007 | Siegal ................ | E05D 13/1284 49/360 |

(Continued)

OTHER PUBLICATIONS

Stephen A. Weis article "RFID (Radio Frequency Identification): Principles and Applications", MIT CSAIL, 23 pages.

*Primary Examiner* — Fadey Jabr
*Assistant Examiner* — Kevin P Mahne
(74) *Attorney, Agent, or Firm* — Frank MacKenzie; Bejin Bieneman

(57) ABSTRACT

A restraint system includes a plurality of sensors deployable in a vehicle, a restraint device, and a computing device. The restraint device includes a tether, a collar, an actuator coupled to a stopper, and an identification tag. The computing device is programmed to engage the stopper to prevent the tether from extending beyond a predetermined length upon at least one of the sensors indicating the identification tag.

20 Claims, 7 Drawing Sheets

(56) References Cited

U.S. PATENT DOCUMENTS

| | | | |
|---|---|---|---|
| 2009/0044758 A1 | 2/2009 | Adams et al. | |
| 2011/0120389 A1* | 5/2011 | Yackley | A01K 1/04 119/796 |
| 2014/0340217 A1 | 11/2014 | Moenning et al. | |
| 2016/0227732 A1* | 8/2016 | Pompey | A01K 1/0263 |

* cited by examiner

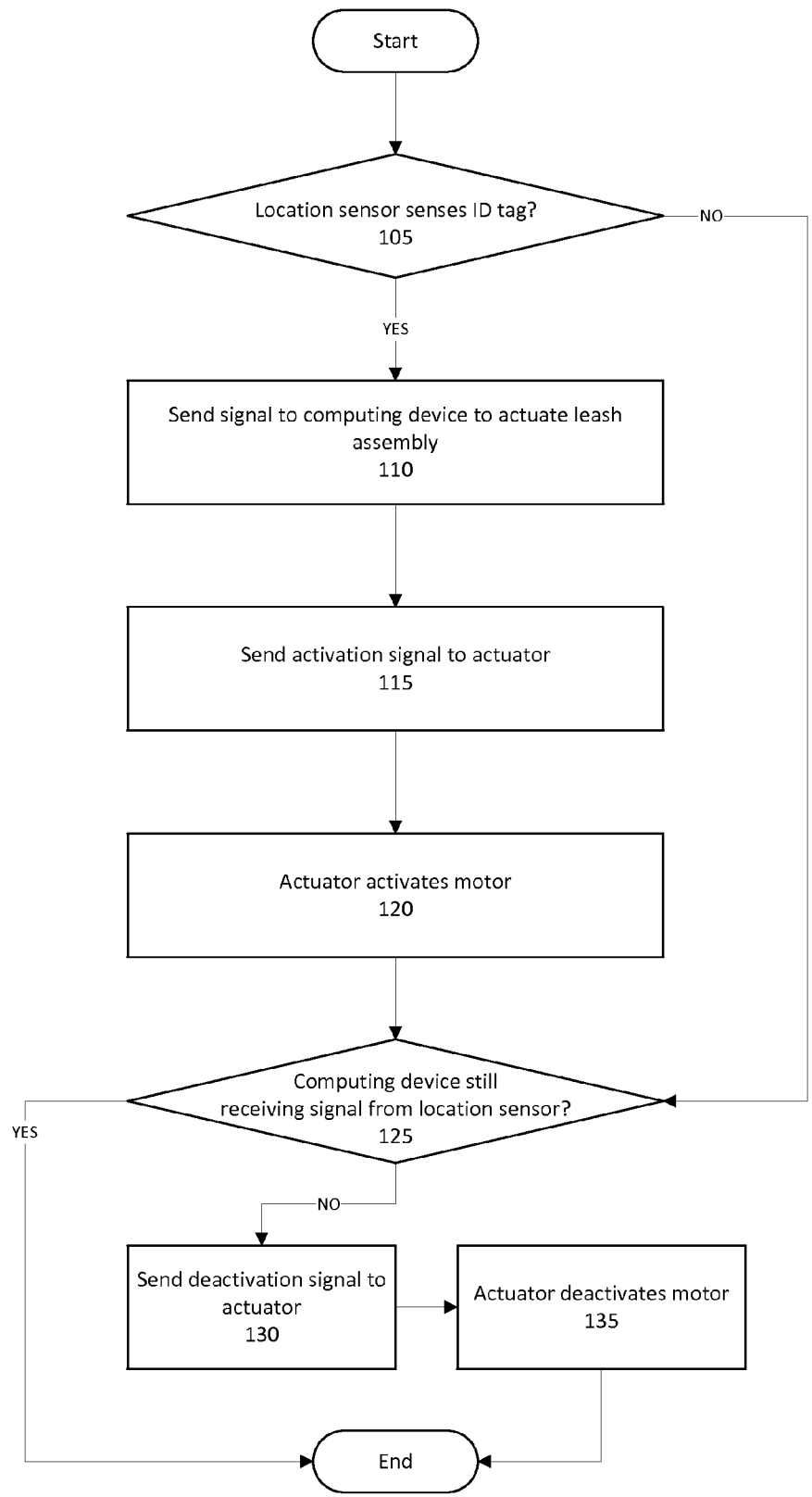

PET RESTRAINT SYSTEM

BACKGROUND

Drivers often bring their pets into their vehicles when driving. Pet owners may allow their pets to move freely around the vehicle. However, the pet may interfere with the pet owner driving. Furthermore, the pet may jump out of an open window.

BRIEF DESCRIPTION OF THE DRAWINGS

FIG. 7 is a process flow diagram of an example process for operating the restraint system.

DETAILED DESCRIPTION

Figure 1:
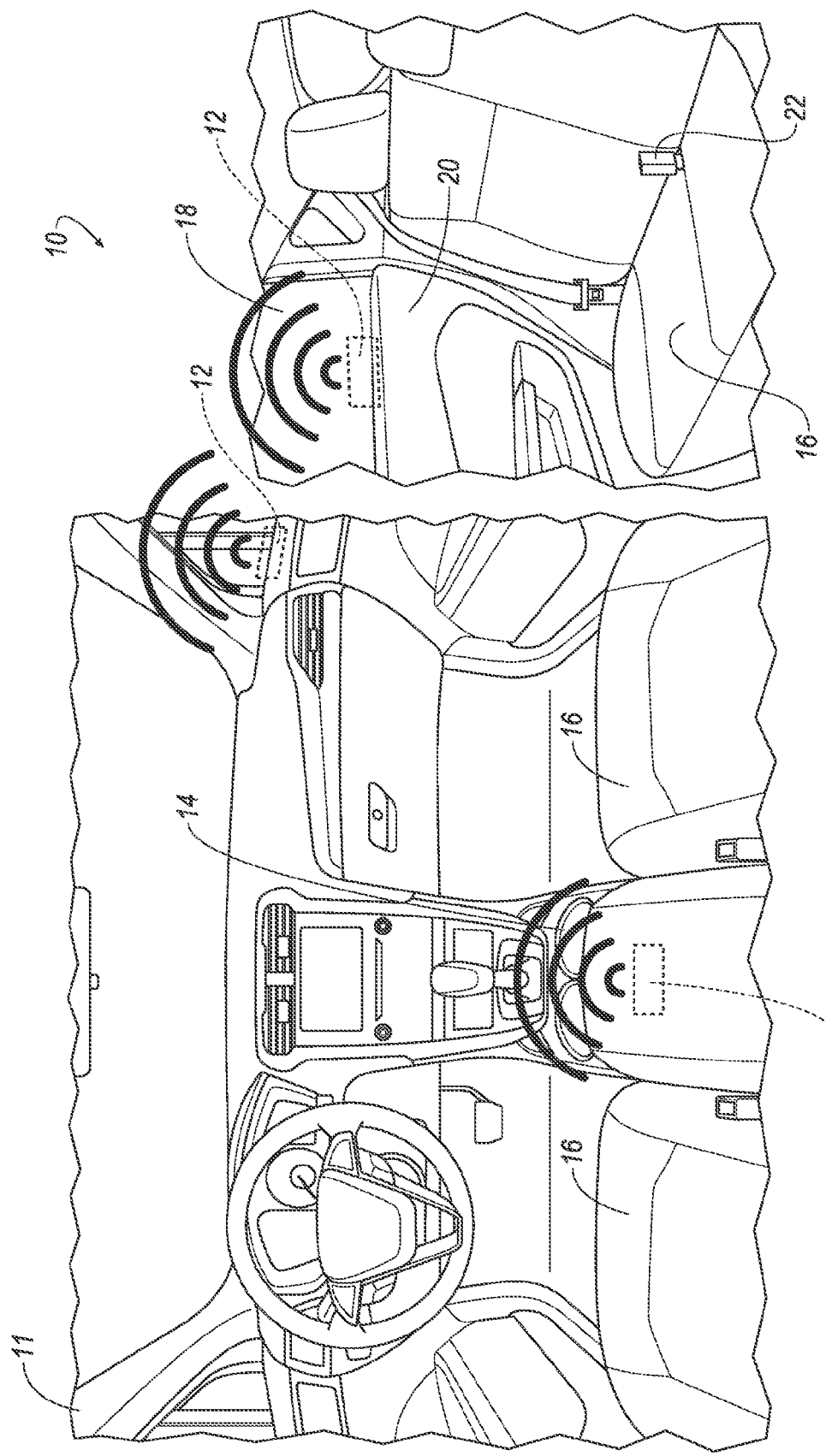
FIG. 1 is a view of an exemplary restraint system in a vehicle.

With reference to the Figures, wherein like numerals indicate like parts throughout the several views, FIG. 1 illustrates a system 10 for restraining a pet in a vehicle 11. The vehicle 11 includes a plurality of location sensors 12, a console 14, seats 16, windows 18, doors 20, and a seat belt 22.

The location sensors 12 are located throughout the vehicle 11. A location sensor 12 detects a proximity of a pet collar 32 RFID tag 34, and provides data indicating a location of the sensor 12 and the proximity of the pet collar 32 in the vehicle 11 to a computer 60 via a network 70, e.g. WiFi, Bluetooth, etc. The network 70 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services. The location sensors may be housed in one or more of the console 14, the seats 16, the windows 18, and the doors 20.

The console 14 divides a front compartment of the vehicle 11 and is positioned between the seats 16. One of the location sensors 12 is located in the console 14 to send a signal of the location of the sensor 12 when actuated.

The location sensors 12 can define boundaries of a space that a pet may traverse in the vehicle 11. Specifically, the location sensors 12 identify boundaries within which the pet may move, and at which the pet may be prevented from further movement. For example, a location sensor 12 on the console 14 may be used to prevent the pet from moving toward the driver while the vehicle 11 is in motion, and a location sensor 12 on the window 18 may indicate that the pet is in a position to extend its head, legs, or other body parts out of the open window 18 during operation of the vehicle 11.

Figure 2:
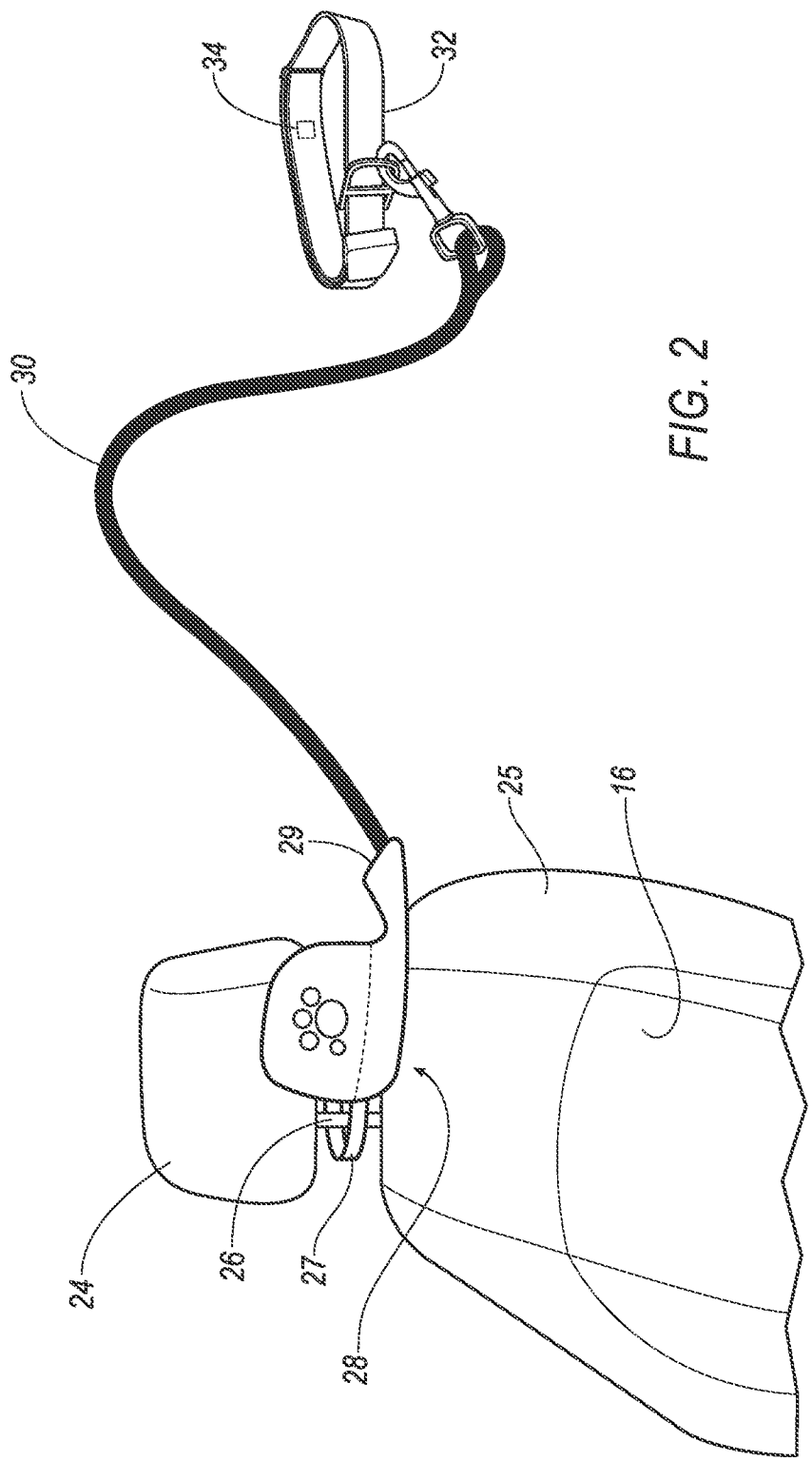
FIG. 2 is an exemplary view of the restraint system with a leash assembly attached to a vehicle seat.

FIG. 2 illustrates an example of the system 10. Here, the seat 16 includes a head rest 24, a seat back 25, and at least one post 26 connecting the head rest 24 to the seat back 25. A securing latch 27 secures a leash assembly 28 to one or more posts 26. The leash assembly 28 includes a case 29 and a tether 30 extending out from the case 29. The tether 30 attaches to a collar 32 having an identifier tag 34, e.g., a radio-frequency identification (RFID) tag.

The post 26 allows an anchor point for the leash assembly 28. By securing the leash assembly 28 to the post 26 with the securing latch 27, the leash assembly 28 may restrain the pet and the pet will not be able to remove the leash assembly 28 from the post 26. The post 26 also transfers the energy from the leash assembly 28 as it is pulled by the pet into the seat back 25, which provides support and is sturdier than other attachment points. The post 26 may be constructed from, e.g., metal, a composite material, etc.

The securing latch 27 may be any suitable mechanism to secure the leash assembly 28 to an attachment point, e.g., the post 26. For example, the latch 27 may be a fabric line, a metal lock, a hook-and-loop fastener, an elastic cord, etc. The securing latch 27 may be configured to be easily attachable by a person while difficult to disengage by the pet.

The leash assembly 28 includes the case 29 and the tether 30 extending out from the case 29. The case 29 houses the various components of the leash assembly, as discussed below. The tether 30 may extend and retract based on where the pet moves in the vehicle 11. The tether 30 may be of any material having sufficient flexibility and strength to restrain a pet in the vehicle 11, e.g., a fabric line, a polymer line, a metallic chain, etc.

The tether 30 attaches to the collar 32. The collar 32 attaches to the pet and restrains the pet in conjunction with the leash assembly 28. The collar may be any of a variety of materials known for pet collars, e.g., fabric, metal, polymer, etc.

The collar 32 includes an identification tag 34, e.g., an RFID tag. The identification tag 34 is identifiable by the location sensors 12. When the identification tag 34 approaches one of the location sensors 12, the location sensor 12 sends a signal to the leash assembly 28, which prevents payout of the tether 30 thereby restraining a pet that is secured by the tether 30.

Figure 3:
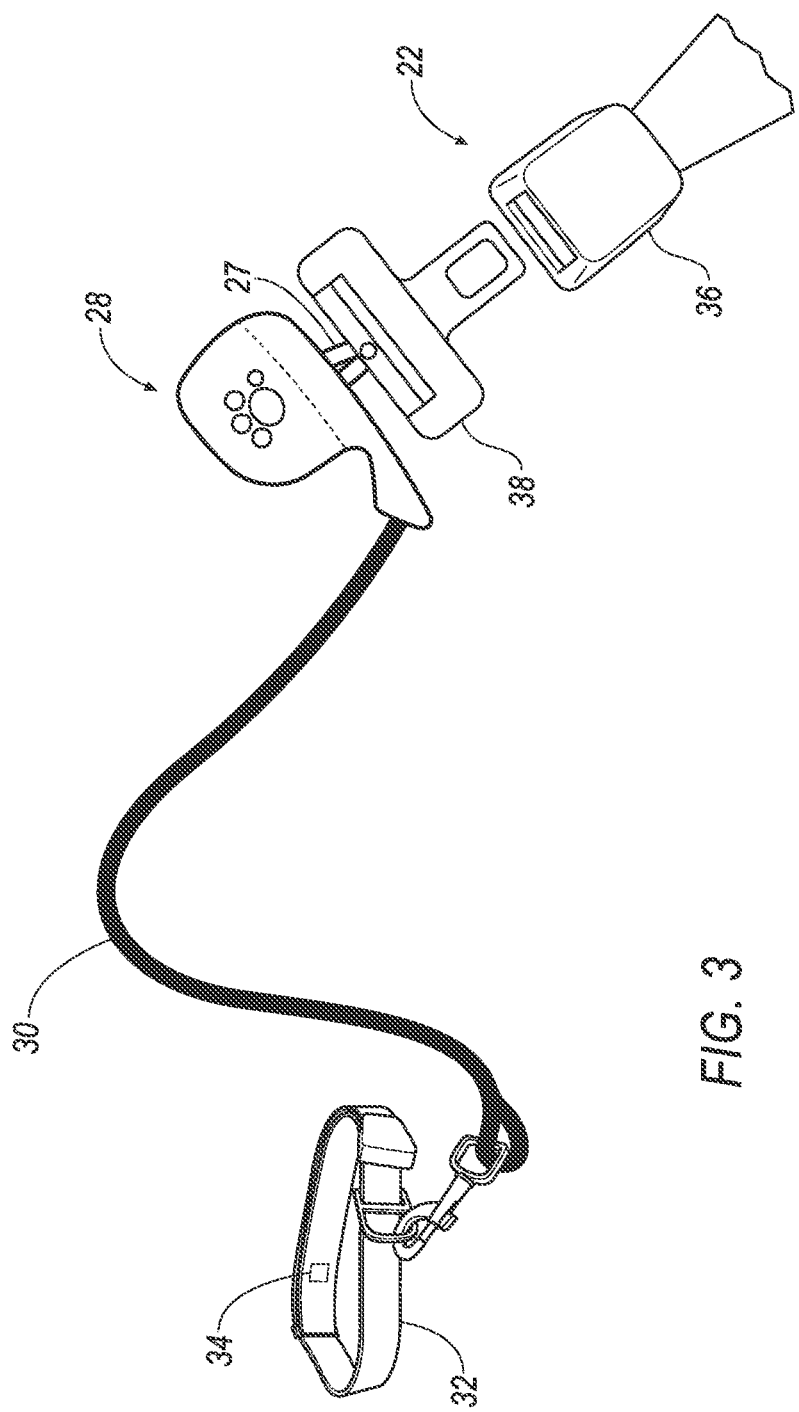
FIG. 3 is another exemplary view of the restraint system with the leash assembly attached to a seat belt.

FIG. 3 illustrates another example of the system 10. Here, the latch 27 connects the leash assembly 28 to the seat belt 22. Specifically, the seat belt 22 includes a buckle portion 36, and a tongue portion 38. The latch 27 connects to the tongue portion 38, allowing the tether 30 to freely move into and out from the case 29. As in FIG. 2, the tether 30 is attached to the collar 32, which has an RFID tag 34.

The seat belt 22 includes the buckle portion 36 and the tongue portion 38. The buckle portion 36 is fixed to the seat 16. The tongue portion 38 includes a seat belt webbing (not shown) that is attached to the seat 16. The securing latch 27 may attach to either the tongue portion 38, as shown in FIG. 3, or the buckle portion 36 (not shown), providing an anchor point for the leash assembly 28.

By attaching the leash assembly 28 to the seat belt 22, the leash assembly 28 may advantageously use the restraint mechanisms of the seat belt 22 (e.g. pretensioners, webbing locks, etc.) to aid in restraining the pet. For example, the seat belt 22 is generally designed to withstand forces equivalent to that of an adult human. Most animals to be restrained by the leash assembly 28 are smaller, i.e., have less mass, than an adult human, so the seat belt 22 will be able to secure the leash assembly 28.

Figure 4:
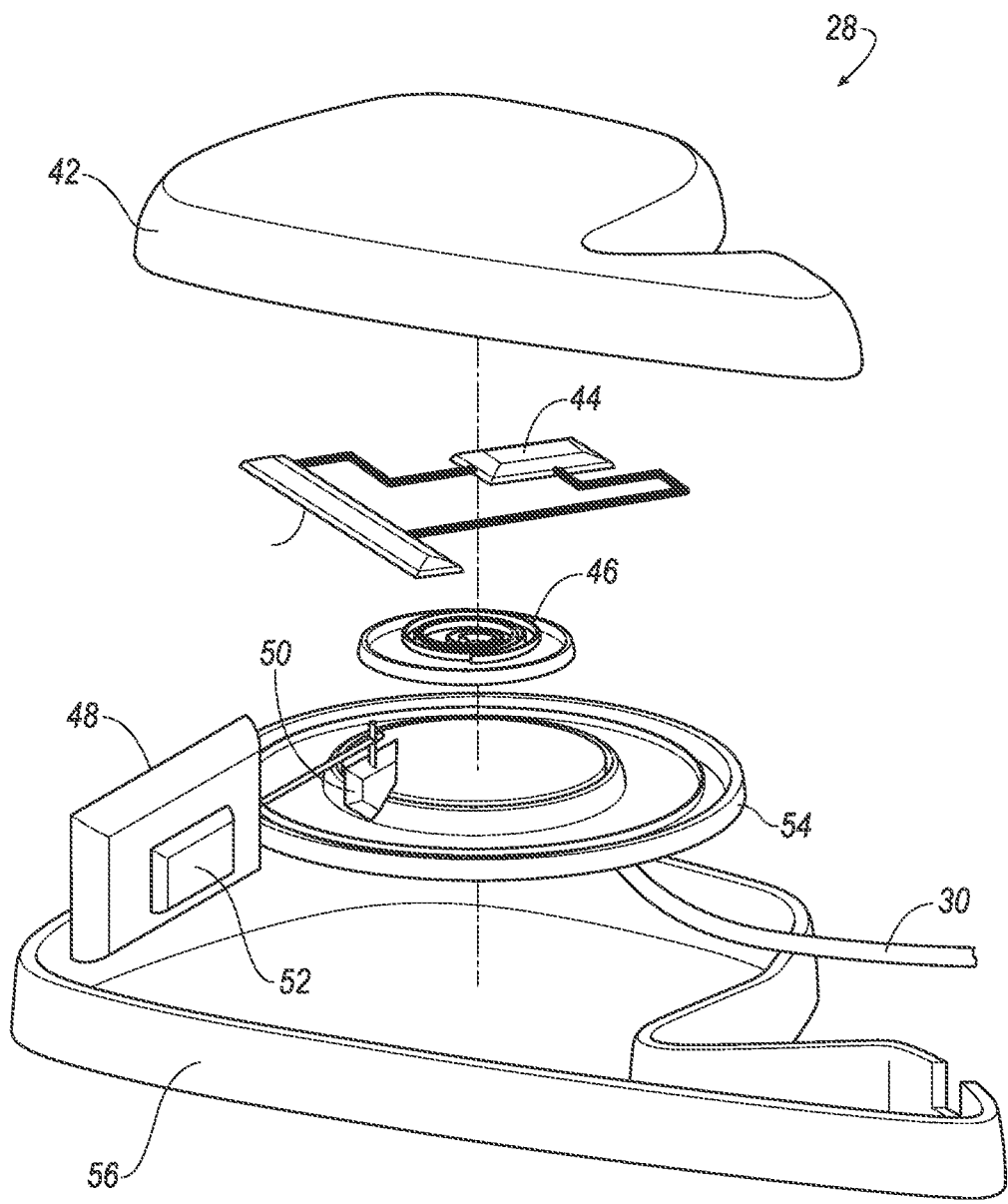
FIG. 4 is an exploded view of the leash assembly.

FIG. 4 illustrates an exploded view of the leash assembly 28. The leash assembly 28 includes the case 29, including an upper case 42 and a lower case 56, a battery 44, a spring 46, a motor 48, a stopper 50, a proximity sensor 52, and a spindle 54. The tether 30 wraps around the spindle 54 and extends through the case 29.

The upper case 42 and the lower case 56 (together forming the case 29) house the components of the leash assembly 28. The case 29 may be of any suitable construction to house the components and may be constructed of, e.g., a polymer, a metal, a composite, etc.

The battery 44 powers the components of the leash assembly 28, including the motor 48 and the proximity sensor 52. The battery 44 may be of any suitable type, e.g., lithium-ion.

The spring 46 works in conjunction with the spindle 54 to retract the tether 30. As the pet pulls on the tether 30 and the tether 30 unrolls from the spindle 54, energy is stored in the spring 46. When the pet moves such that the tether 30 has slack, the spring 46 unwinds and rotates the spindle 54, retracting the tether 30 around the spindle 54. The spring 46 may be arranged to absorb and release rotational energy of the spindle 54, and may be disposed in the interior of the spindle 54, as shown in FIG. 4, or in any suitable position to rotate the spindle 54 to retract the tether 30.

The spindle 54 houses the tether 30 and the spring 46. The spindle 54 may be constructed of any suitable material, e.g. metal, polymer, etc. The tether 30 wraps around the spindle 54 for release and retraction of the tether 30.

The motor 48 moves the stopper 50 into the spindle 54 to prevent rotation of the spindle 54 and restrains the tether 30. The motor 48 is of any type that may be provided to move the stopper 50, e.g., a brushless electric motor, and is communicatively connected to the battery 44 and the proximity sensor 52. The stopper 50 may be, e.g., a pointed object configured to apply friction to a part of the spindle 54 to stop the spindle 54 from rotating.

Figure 5A:
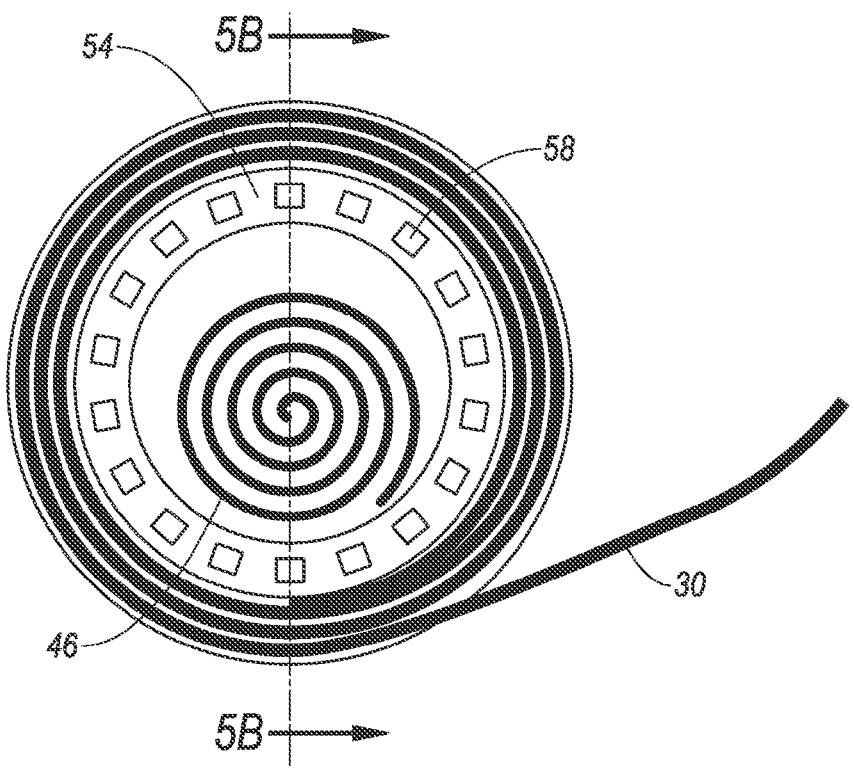
FIG. 5A is a plan view of a spindle of the leash assembly.
Figure 5B:
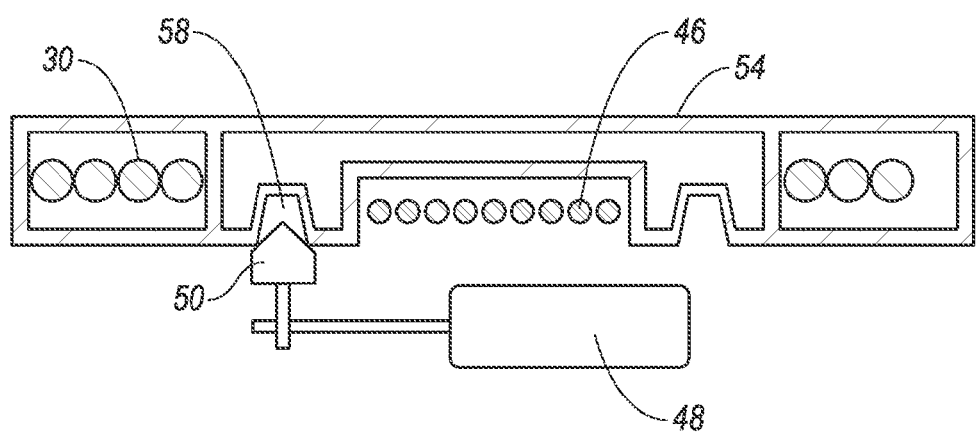
FIG. 5B is a cross-sectional view of the spindle of FIG. 5A showing actuation of a stopper to stop the spindle.

FIGS. 5A and 5B illustrate how the leash assembly 28 stops the tether 30. FIG. 5A shows the spindle 54 with the tether 30 wrapped around the spindle 54 and the spring 46 contained within. The spindle 54 has a plurality of spaces 58.

As shown in FIG. 5B, when activated by the proximity sensor 52, the motor 48 moves the stopper into one of the spaces 58, stopping rotation of the spindle 54 and the tether 30, restraining the pet. The stopper 50 is designed to fit into one of the spaces 58, thus preventing the spindle 54 from rotating any further and preventing release of the tether 30. When the proximity sensor 52 is moved away from one of the location sensors 12, the motor 48 deactivates, releasing the stopper 50 and allowing the spindle 54 to move freely.

The location sensors 12 are situated in the vehicle 11 to define the area that the pet may traverse. For example, it is undesirable to have the pet interfere with the driver, so the location sensor 12 in the console 14 would prevent the pet from moving beyond the console 14. Similarly, the location sensors 12 in the doors 20 and the windows 18 prevent the pet from leaving the vehicle 11 if the doors 20 and the windows 18 are open.

Figure 6:
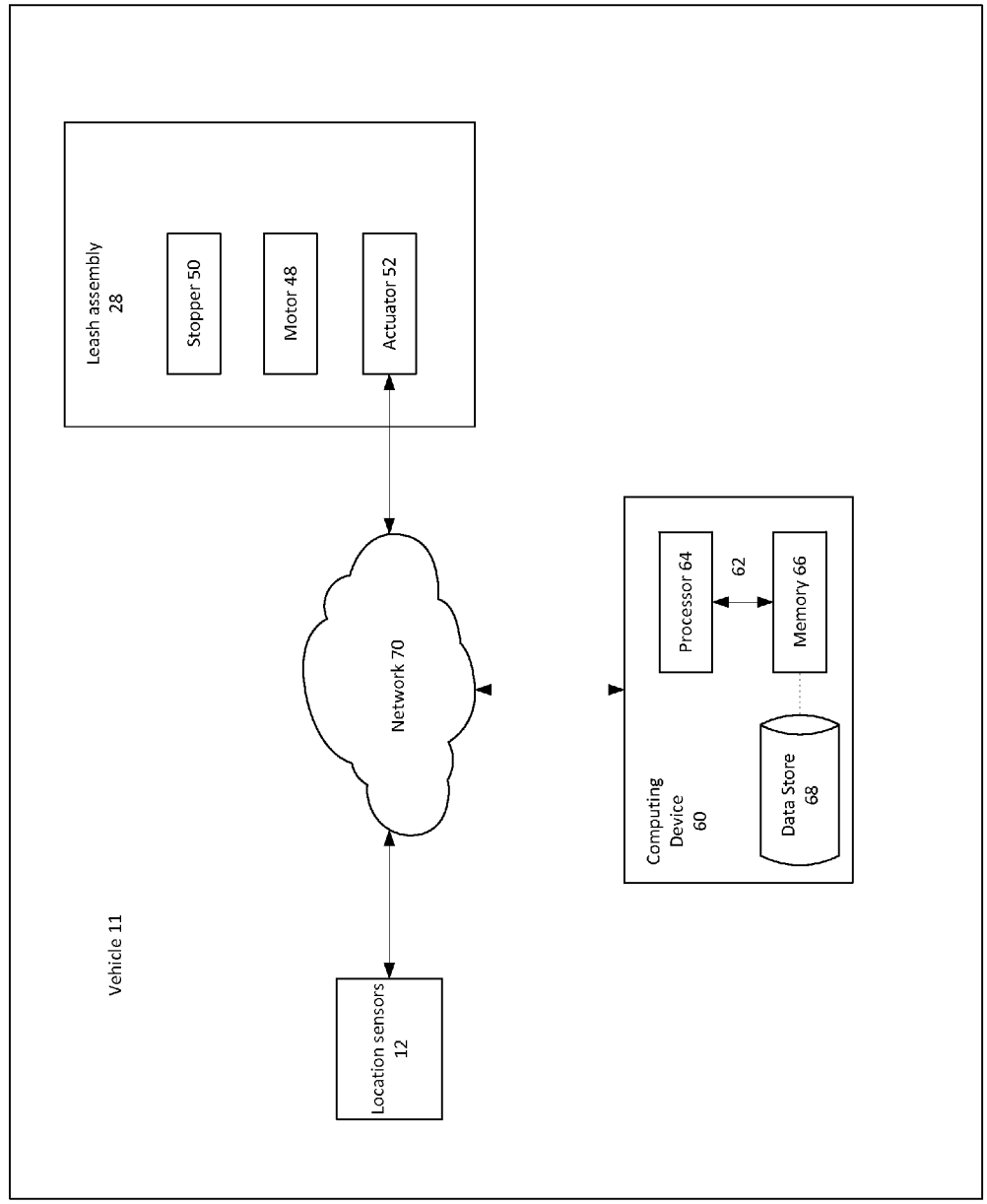
FIG. 6 is a block diagram of the restraint system.

FIG. 6 illustrates a block diagram of the system 10. The system 10 includes the vehicle 11, which includes the computing device 60, the location sensors 12, and the leash assembly 28. The computing device 60 includes a bus 62, a processor 64, a memory 66, and a data store 68. The bus 62 may be, e.g., a controller area network (CAN) bus or the like, such as is known, to provide various communications, including one or more instructions from the memory 66 to the processor 64.

The system 10 further includes the network 70 which transmits data between the computing device 60, the location sensors 12, and the actuator 52.

FIG. 7 illustrates a process 100 for restraining the pet with the system 10. The process 100 begins in a block 105, where the computing device 60 determines whether it has received data from one or more location sensors 12 indicating that the identification tag 34 is in proximity to each of the one or more location sensors 12. If so, the process 100 moves to a block 110. Otherwise, the process 100 moves to a block 125.

In the block 110, the location sensor 12 sends a signal over the network 70 to the computing device 60 to actuate the leash assembly 28.

Next, in a block 115, the computing device 60 sends a signal over the network 70 to the actuator 52 in the leash assembly 28.

Next, in a block 120, the actuator 52 activates the motor 48, moving the stopper 50 into one of the spaces 58 on the spindle 54, stopping payout of the tether 30.

Next, in the block 125, the computing device 60 determines whether the computing device 60 is still receiving a signal from one of the location sensors 12. If so, the process 100 ends. If not, the process 100 moves to a block 130.

In the block 130, the computing device 60 sends a deactivation signal over the network 70 to the actuator 52.

Next, in a block 135, the actuator 52 deactivates the motor 48, releasing the stopper 50 and allowing payout of the tether 30, and the process 100 ends.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

The memory 66 and the data store 68 may each be, e.g., a computer-readable medium. The memory 66 stores instructions executable by the processor 64 to control the motor 48. A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system, comprising:
   a plurality of sensors deployable in a vehicle;
   a restraint device including a tether, an actuator coupled to a stopper, and an identification tag; and
   a computing device programmed to identify one of the sensors detecting the identification tag, and to instruct the actuator to engage the stopper to prevent the tether from extending beyond a boundary specified for the sensor detecting the tag.

2. The restraint system of claim 1, wherein one or more of the sensors are located in or on at least one of a central console, a passenger seat, and a rear seat of the vehicle.

3. The restraint system of claim 1, wherein the restraint device is attachable to at least one of a headrest and a seat belt in the vehicle.

4. The restraint system of claim 3, wherein the restraint device further comprises a securing latch that is attachable to a case and to at least one of the headrest and the seat belt.

5. The restraint system of claim 1, wherein the restraint device further includes a spindle and a spring attached to the spindle.

6. The restraint system of claim 5, wherein the stopper is moveable toward the spindle to stop the spindle from rotating.

7. The restraint system of claim 5, wherein the spindle includes a plurality of spaces configured to receive the stopper.

8. The restraint system of claim 5, wherein the restraint device further includes a motor connected to the stopper, and the motor is configured to move the stopper to stop the spindle.

9. The restraint system of claim 8, wherein the motor is communicatively connected to the actuator.

10. The restraint system of claim 5, wherein the spindle is a ratchet.

11. The restraint system of claim 5, wherein the stopper is at least one of a pawl and a hook.

12. The restraint system of claim 5, wherein the tether is wrapped around the spindle.

13. A method, comprising:
    determining whether a sensor detects an identification tag;
    sending a signal to a restraint device based on detection of the identification tag;
    identifying one of the sensors detecting the identification tag; and
    activating an actuator in the restraint device to prevent a tether from extending beyond a boundary specified for the sensor detecting the tag.

14. The method of claim 13, wherein the tether is configured to be attached to a collar.

15. The method of claim 13, wherein the actuator is configured to move a stopper toward a rotator to stop the rotator from rotating, the tether being wrapped around the rotator.

16. The method of claim 15, wherein the rotator is a spindle with a plurality of spaces configured to receive the stopper.

17. The method of claim 15, wherein the stopper is a pawl.

18. The method of claim 13, wherein the restraint device is configured to attach to at least one of a headrest and a seat belt in a vehicle.

19. The method of claim 18, further comprising a latch configured to attach to a case and to at least one of the headrest and the seat belt.

20. The method of claim 13, further comprising deactivating the actuator when the sensor no longer detects the identification tag.

* * * * *